US008861718B2

(12) United States Patent
Lee et al.

(10) Patent No.: US 8,861,718 B2
(45) Date of Patent: Oct. 14, 2014

(54) METHOD OF PREVENTING FAULT-INJECTION ATTACKS ON CHINESE REMAINDER THEOREM-RIVEST SHAMIR ADLEMAN CRYPTOGRAPHIC OPERATIONS AND RECORDING MEDIUM FOR STORING PROGRAM IMPLEMENTING THE SAME

(75) Inventors: Seung-Kwang Lee, Yeoju-gun (KR); Doo-Ho Choi, Cheonan (KR); Hyun-Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 190 days.

(21) Appl. No.: 13/585,731

(22) Filed: Aug. 14, 2012

(65) Prior Publication Data
US 2013/0208886 A1 Aug. 15, 2013

(30) Foreign Application Priority Data

Feb. 10, 2012 (KR) .................. 10-2012-0013776
Jul. 10, 2012 (KR) .................. 10-2012-0074949

(51) Int. Cl.
*H04L 9/00* (2006.01)
*H04L 9/28* (2006.01)
*H04L 9/30* (2006.01)

(52) U.S. Cl.
CPC ... *H04L 9/28* (2013.01); *H04L 9/30* (2013.01)
USPC ............................................. 380/28; 380/30

(58) Field of Classification Search
CPC .................................... H04L 9/28; H04L 9/30
USPC ............................................................ 380/28
See application file for complete search history.

(56) References Cited

U.S. PATENT DOCUMENTS 5,991,415 A * 11/1999 Shamir ........................ 380/30

FOREIGN PATENT DOCUMENTS

KR    1020100039048 A    4/2010

OTHER PUBLICATIONS

C. Aumüller et al., "Fault Attacks on RSA with CRT: Concrete Results and Practical Countermeasures", CHES 2002, LNCS 2523, 2003, pp. 260-275.

* cited by examiner

Primary Examiner — Longbit Chai (57) ABSTRACT

Disclosed herein are a method of preventing fault-injection attacks on Chinese Remainder Theorem (CRT)-Rivest Shamir Adleman (RSA) cryptographic operations, and a recording medium for storing a program implementing the same. First, the method receives first and second primes, that is, different primes, and a randomly selected prime, that is, a random prime, which are used for CRT-RSA cryptographic operations. Thereafter, a cumulative value is calculated by performing an XOR (Exclusive OR) operation on the first prime, the second prime, and the random prime using a push function. Thereafter, the first prime, the second prime, and the random prime are loaded by performing an XOR operation on the cumulative value using a pop function corresponding to the push function. Finally, CRT-RSA operations are executed by computing modulo operations based on the first prime and the second prime.

8 Claims, 5 Drawing Sheets

Input : m, key(d, prime p and q, $z=q^{-1}$ mod p)
Output : $m^d$ mod (p*q)

1 : Random short prime r
2 : $d_{pr}$ = d mod (p-1)(r-1)
3 : push (p, r)
4 : $d_{qr}$ = d mod (q-1)(r-1)
5 : push (q)

6 : p' = pop (p) * pop (r)
7 : q' = pop (q) * pop (r)

8 : $S_{pr}$ = $m^{d_{pr}}$ mod p'
9 : $S_{qr}$ = $m^{d_{qr}}$ mod q'

10 : If $S_{pr} \not\equiv S_{qr}$ mod pop (r)
    return error 11 : $S_p$ = $S_{pr}$ mod pop (p)
12 : $S_q$ = $S_{qr}$ mod pop (q)
13 : S = $(((S_p - S_q)$ mod p) * $q^{-1}$ mod p) * q + $S_q$
14 : If (S $\not\equiv$ $S_{pr}$ mod p) or (S $\not\equiv$ $S_{qr}$ mod q)
    return error 15 : check = sum $\bigoplus_{w \in W}$ W
16 : If (check $\neq$ 0)
    return error
17 : return S

FIG.1

```
1 : sum = sum ⊕ x ⊕ y ⊕ ···
2 : W = W ∪ {x, y, ···}
```

FIG.2

```
1 : T = W - {x}
2 : T_sum = ⊕_{t∈T} t
3 : Result = sum ⊕ T_sum
4 : Sum = T_sum ⊕ Result
5 : return Result
```

FIG.7

METHOD OF PREVENTING FAULT-INJECTION ATTACKS ON CHINESE REMAINDER THEOREM-RIVEST SHAMIR ADLEMAN CRYPTOGRAPHIC OPERATIONS AND RECORDING MEDIUM FOR STORING PROGRAM IMPLEMENTING THE SAME

CROSS REFERENCE TO RELATED APPLICATION

This application claims the benefit of Korean Patent Application Nos. 10-2012-0013776 and 10-2012-0074949, filed on Feb. 10, 2012 and Jul. 10, 2012, which are hereby incorporated by reference in its entirety into this application.

BACKGROUND OF THE INVENTION

1. Technical Field

The present invention relates generally to a method of preventing fault-injection attacks on Chinese Remainder Theorem (CRT)-Rivest Shamir Adleman (RSA) cryptographic operations and a recording medium for storing a program implementing the same, and, more particularly, to a method of preventing fault-injection attacks which occur during the execution of a CRT-RSA cryptography algorithm and a recording medium for storing a program implementing the same.

2. Description of the Related Art

RSA is a cryptography and authentication system which performs encryption and decryption using a public key and a private key. A CRT-RSA algorithm applies CRT to an RSA algorithm, thereby providing an operational speed four times faster.

A fault-injection attack on a cryptographic operation device is an analysis method that induces electronic security equipment which executes a cryptography algorithm to make a fault during operations using a variable voltage, a variable clock or a laser, and then analyzes obtained resulting values, thereby obtaining confidential information such as an encryption key.

A representative of fault-injection attacks on the CRT-RSA algorithm is a Bellcore attack. A variety of protection techniques starting with a Shamir's protection scheme have been proposed. An example thereof is disclosed in Korean Unexamined Patent Publication Application No. 10-2008-0098252.

However, the convention protection techniques are problematic in that they are vulnerable to fault-injection attacks or require excessively more operations than the CRT-RSA algorithm.

SUMMARY OF THE INVENTION

Accordingly, the present invention has been made keeping in mind the above problems occurring in the prior art, and an object of the present invention is to provide a method of preventing fault-injection attacks which is capable of preventing fault-injection attacks occurring during the execution of the operations of a CRT-RSA cryptography algorithm, thereby being safe from the fault-injection attacks and also efficiently computing a signature value, and a recording medium for storing a program implementing the method.

In order to accomplish the above object, the present invention provides a method of preventing fault-injection attacks on CRT-RSA cryptographic operations, including receiving first and second primes, that is, different primes, and a randomly selected prime, that is, a random prime, which are used for CRT-RSA cryptographic operations; calculating a cumulative value by performing an XOR (Exclusive OR) operation on the first prime, the second prime, and the random prime using a push function; loading the first prime, the second prime, and the random prime by performing an XOR operation on the cumulative value using a pop function corresponding to the push function; and executing CRT-RSA operations by computing modulo operations using the first prime and the second prime.

A fault having occurred during the loading of any one of the first prime, the second prime, and the random prime may spread to remaining values of the first prime, the second prime, and the random prime via the cumulative value, thereby preventing the fault-injection attacks.

The method may further include calculating first and second multiplication values by multiplying each of the loaded first and second primes by the random prime, calculating a first random reference value by computing (a message to be sent raised to a power of a first exponent) mod (the first multiplication value) and a second random reference value by computing (the message raised to a power of a second exponent) mod (the second multiplication value), and detecting a fault, having occurred during the operations for calculating the first and second random reference values, using the first random reference value and the second random reference value.

The detecting the fault may include a value obtained by computing (the first random reference value) mod (the loaded random prime) with a value obtained by (the second random reference value) mod (the random prime), and determining that the fault has occurred if the two values are different from each other.

The method may further include calculating third and fourth random reference values by computing (the loaded first prime) mod (the first random reference value) and (the loaded second prime) mod (the second random reference value), and detecting a fault that has occurred during an operation for calculating a signature value using the third and fourth random reference values.

The detecting a fault that has occurred during an operation for calculating a signature value may include determining that the fault has occurred if a value obtained by computing (the signature value) mod (the first prime) and a value obtained by computing (the first prime) mod (the first random reference value) are different from each other, or if a value obtained by computing (the signature value) mod (the second prime) and a value obtained by computing (the second prime) mod (the second random reference value) are different from each other.

The method may further include detecting the fault having occurred during the CRT-RSA operation using a value obtained by adding the first prime, the second prime and the random prime together.

The random prime may have a size of at least 32 bits.

In order to accomplish the above object, the present invention provides a recording medium for storing a program implementing the method of preventing fault-injection attacks on CRT-RSA cryptographic operations.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, throughout which the same reference numerals are used to designate the same or similar components.

Embodiments of the present invention will be described in detail below with reference to the accompanying drawings.

Figure 1:
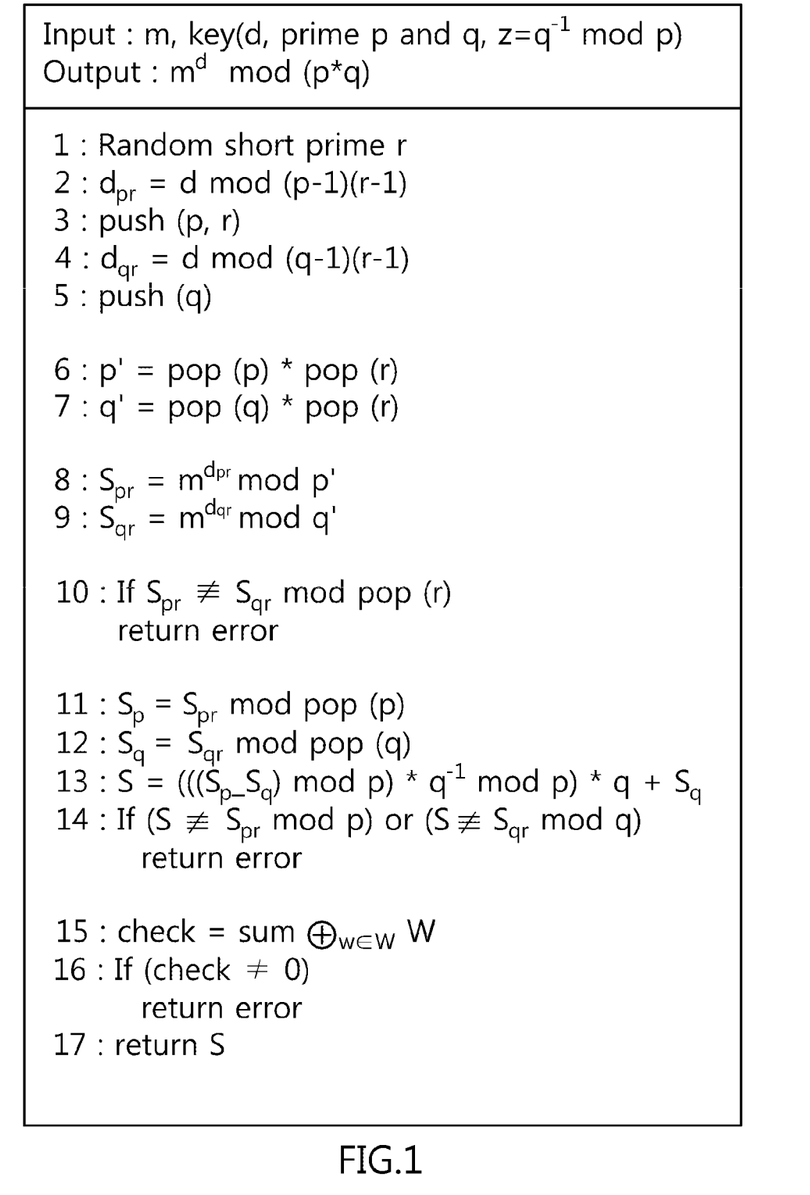
FIG. 1 is a diagram showing a CRT-RSA cryptography algorithm that is applied to the present invention.

FIG. 1 is a diagram showing a CRT-RSA cryptography algorithm that is applied to the present invention.

As shown in FIG. 1, the CRT-RSA cryptography algorithm that is applied to the present invention receives a message m to be sent, a plurality of keys, that is, d, primes p and q, and $z=q^{-1}$ mod p, and also receives a randomly selected short prime r.

Thereafter, the value of d is calculated by computing d mod (p−1)*(r−1), and the total cumulative value is calculated by performing an XOR (eXclusive OR) operation on the values of p and r using a push function. Furthermore, the value of $d_{pr}$ is calculated by computing d mod $(q^{-1})*(r-1)$, and the total cumulative value is calculated by performing an XOR operation on the value of q using a push function.

Figure 2:
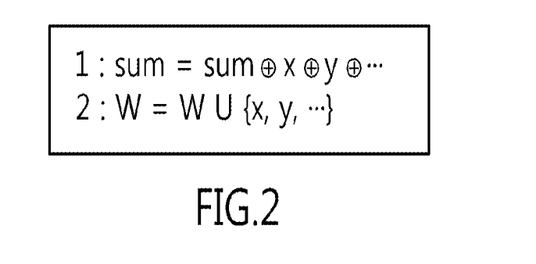
FIG. 2 is a diagram showing the push function algorithm of the CRT-RSA cryptography algorithm which is applied to the present invention.

Here, for a push function that is used to calculate the total cumulative value for the values of p, q and r, refer to FIG. 2

FIG. 2 illustrates the push function algorithm of the CRT-RSA cryptography algorithm which is applied to the present invention, particularly the algorithm of the function push(x, y).

As shown in FIG. 2, push(x, y) performs an XOR operation on x and y, and accumulates a resulting value in sum. The set W has variable values accumulated in sum, as elements.

Accordingly, when push(p, r) in the third row is computed in the algorithm shown in FIG. 1, sum=p⊕r and W={p, r} are obtained. Furthermore, when push(q) in the fifth row of FIG. 1 is calculated, sum=p⊕q⊕r and W={p, q, r} are obtained.

After the push function in the fifth row of FIG. 1 has been calculated, p' is calculated from the product of pop(p) and pop(r), and q' is calculated from the product of pop(q) and pop(r).

Figure 3:
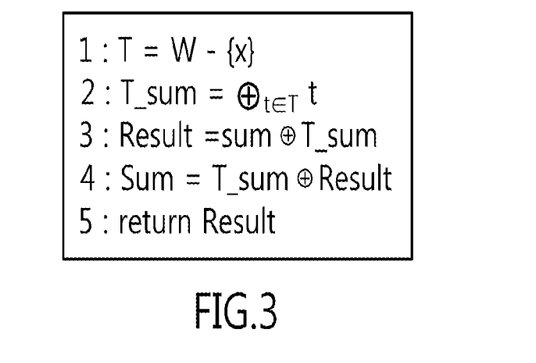
FIG. 3 is a diagram showing the pop function algorithm of the CRT-RSA cryptography algorithm which is applied to the present invention.

Here, for the detailed algorithm of the pop function, refer to FIG. 3.

FIG. 3 illustrates the pop function algorithm of the CRT-RSA cryptography algorithm which is applied to the present invention, particularly the detailed algorithm of the function pop(x).

As shown in FIG. 3, pop(x) first calculates the value of T_sum by performing an XOR operation on the remaining elements obtained by eliminating the element x from the set W of FIG. 2. Thereafter, the value of Result is calculated by performing an XOR operation on sum calculated in FIG. 2 and T_sum calculated in FIG. 3, and, in turn, the value of Sum is calculated by performing an XOR operation on T_sum and Result.

Accordingly, T_sum=q⊕r is obtained because T={q, r} is obtained by pop(p) in the sixth row of the algorithm shown in FIG. 1, and Result=(p⊕q⊕r)⊕(q⊕r)=p is obtained by performing an XOR operation on sum and T_sum accumulated in FIG. 2, with the result that Sum=p⊕q⊕r is obtained.

In contrast, if p becomes p* because a fault is caused by a Bellcore attack while memory is being accessed in order to retrieve p in FIG. 2, the value which is pushed is not p but p*. In this case, the value accumulated in sum is p*⊕q⊕r. Thereafter, Result(q)=(p*⊕q⊕r)⊕(p⊕r)=(p*⊕p⊕q) is obtained while q is being popped in FIG. 3, and therefore Result(q)≠q is obtained, with the result that Sum=p*⊕q⊕r is obtained.

That is, it can be seen that the fault spreads because the fault injected into p influences not only p but also q. In the same manner, the fault may be spread to r.

When the fault injected into p spreads to q and r as described above, the value of the fault is applied to the value of $S_{pr}$ calculated by computing $m^{d_{pr}}$ mod p' in the eighth row and the value of $S_{qr}$ calculated by computing $m^{d_{qr}}$ mod q' in the ninth row, and therefore $S_{pr}$ in the tenth row becomes different from a value obtained by computing $S_{qr}$ mod pop(r), with the result that a primary fault is detected in the tenth row. In this case, the probability of detecting the fault is proportional to the length of r.

Here, since r is a random prime, the length of r is variable. If a large value is selected for r, the probability of an undetectable fault being present decreases, but operational efficiency deteriorates because the modular operation involving the large number should be computed. In contrast, if a small value is selected for r, operational efficiency is relatively higher, but safety may be jeopardized because there is an increased probability of an undetectable fault being present. As a result, in order to provide sufficient safety, the number of bits of r should be at least 32.

Thereafter, in the 11th row, $S_p$ is calculated by computing $S_{pr}$ mod pop(p), and in the 12th row, $S_q$ is calculated by computing $S_{qr}$ mod pop(q). Then the signature value S is calculated by applying $S_p$ and $S_q$, calculated in the 11th and 12th rows, to Garner's CRT recombination formula.

An equation for calculating the signature value S using CRT recombination is expressed by the following Equation 1:

$$S=(((S_p-S_q) \bmod p) \times q^{-1} \bmod p) \times q + S_q \quad (1)$$

As expressed in Equation 1, the signature value S can be calculated by adding $S_q$ to a value obtained by multiplying a value by q, the last value being obtained by multiplying a value obtained by computing $(S_p-S_q)$ mod p by a value obtained by computing $q^{-1}$ mod p.

Meanwhile, in the 14th row of FIG. 1, a fault injected during CRT recombination in the 13th row is detected using the correlation between the signature value S calculated in the 13th row and $S_p$ or $S_q$. That is, if a value obtained by computing $S_{pr}$ mod p or a value obtained by computing $S_{qr}$ mod q is different from the signature value S, it is determined that a fault has been injected, and the fault is detected.

Furthermore, when a fault is injected during an internal operation of the pop function in the 11th row of FIG. 1, the value of p which is used for a modulo operation is distorted, and also the distorted value of q is calculated when the value of q is popped in the 12th row, so that the fault spreads. In this case, a Bellcore attack is not applied.

When a fault is injected during an internal operation of the pop function in the 11th row as described above, check≠0 is obtained because of the spread of the fault in the 15th row, with the result that the fault is finally detected in the 16th row.

Figure 4:
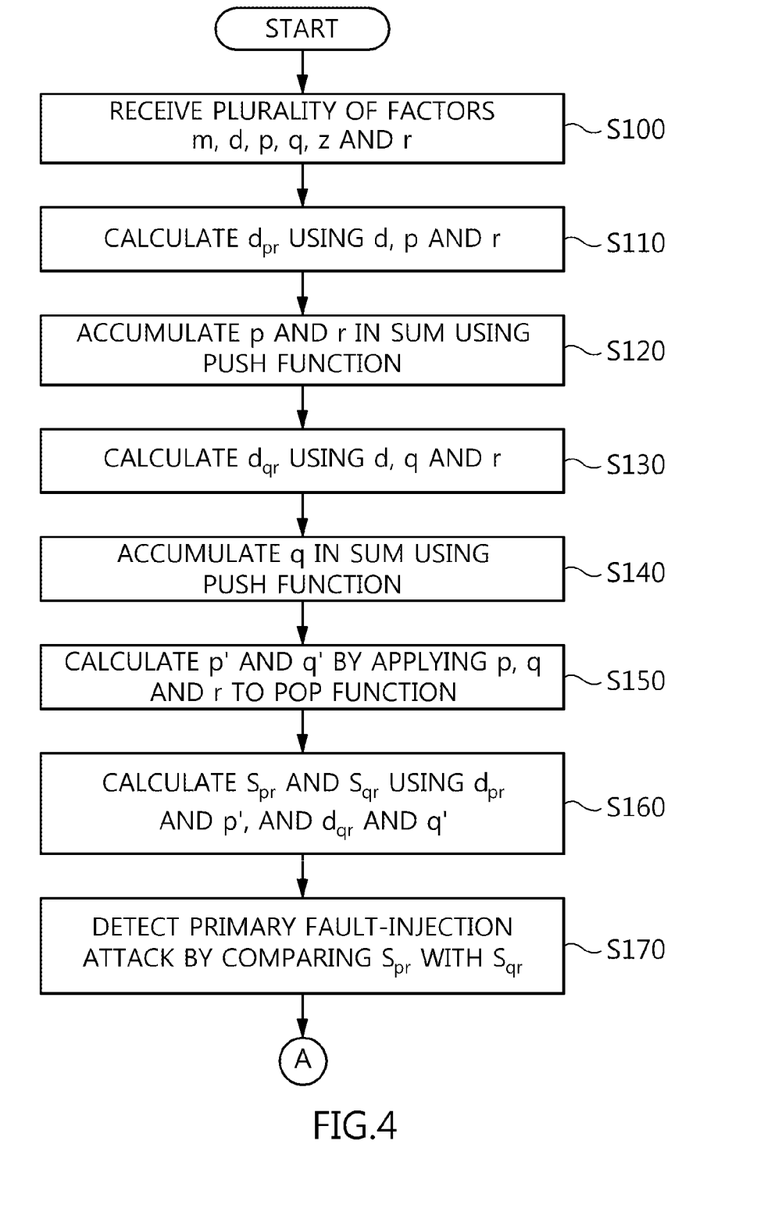
FIGS. 4 to 6 are flowcharts showing the operational flow of a method of preventing fault-injection attacks on CRT-RSA cryptographic operations according to the present invention.
Figure 5:
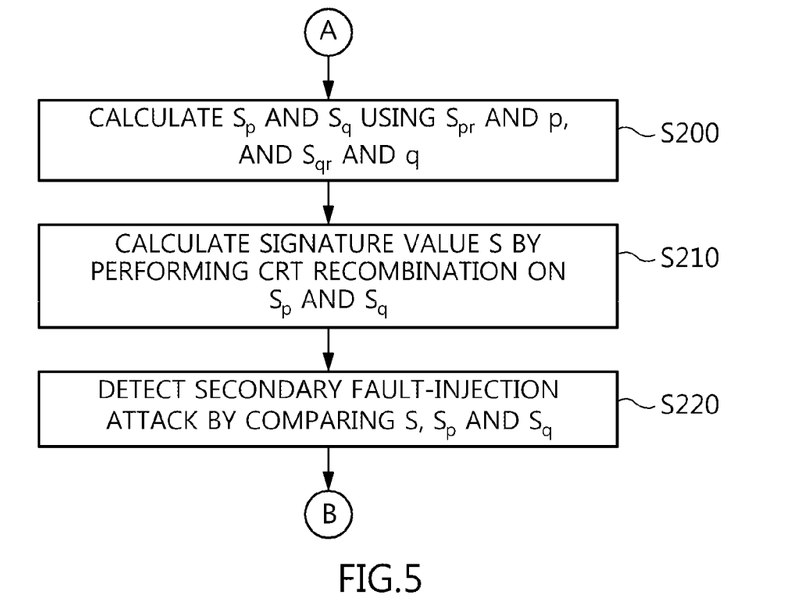
Figure 6:
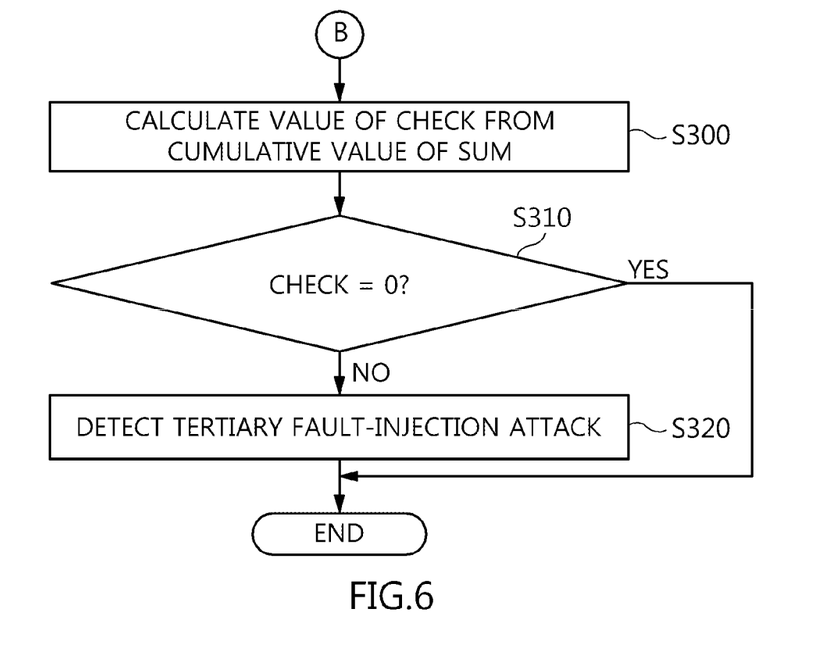

FIG. 4 to FIG. 6 are flowcharts showing the operational flow of a method of preventing fault-injection attacks on CRT-RSA cryptography operations according to the present invention.

First, as shown in FIG. 4, the method of preventing fault-injection attacks on CRT-RSA cryptography operations according to the present invention receives a plurality of factors, that is, a message m to be sent, d, primes p and q, and $z=q^{-1}$ mod p as keys, and also receives a randomly selected short primer at step S100.

Thereafter, the value of $d_{pr}$ is calculated using d, p and r, input at step S100, at S110, and a value obtained by performing an XOR operation on the values of p and r used using a push function is accumulated in sum at step S120. Here, the value of $d_{pr}$ is calculated by computing d mod (p−1)*(r−1).

Meanwhile, the value of $d_{pr}$ is calculated using d, q and r, input at step S100, at S130, and a value obtained by performing an XOR operation on the value of q using a push function is accumulated in sum at step S140. Here, the value of $d_{pr}$ is calculated by computing d mod (q−1)*(r−1).

For the push function which is used to calculate the cumulative value for the values of p, q and r at steps S120 and S140, refer to FIG. 2.

Furthermore, p' and q' are calculated from p, q and r using a pop function at step S150. In other words, p' is calculated from the product of pop(p) and pop(r), and q' is calculated from the product of pop(q) and pop(r). For the detailed algorithm of the pop function, refer to FIG. 3.

Here, the value of p applied to pop(p) may be calculated from sum⊕(q⊕r)=(p⊕q⊕r)⊕(q⊕r)=p, and the calculated value of p is used in the pop function to calculate the cumulative value Sum. Here, since the length of r is different from the length of p and q, zero-extension is applied to the front part of p in order to adjust the length of r to the length of p and q.

Thereafter, $S_{pr}$ is calculated using $d_{pr}$ calculated at step S110 and p' calculated at step S150, and $S_{pr}$ is calculated using $d_{qr}$ calculated at step S130 and q' calculated at step S150 at step S160.

In other words, $S_{pr}$ is calculated by computing $m^{d_{pr}}$ mod p' and $S_{qr}$ is calculated by computing $m^{d_{qr}}$ mod q'.

Meanwhile, if a fault is injected while the value of p is being retrieved to calculate p' at step S150, the value accumulated in Sum in the pop function becomes p*⊕q⊕r, and the fault injected into p spreads to q and r.

As an example, if p becomes p* because a fault is caused by a Bellcore attack while memory is being accessed in order to retrieve the value of p, the value which is pushed is not p but p*. In this case, the value accumulated in sum is p*⊕q⊕r. Thereafter, Result(q)=(p*⊕q⊕r)⊕(p⊕r)=(p*⊕p⊕q) is obtained while q is being popped, and therefore Result(q)≠q is obtained, with the result that Sum=p*⊕q⊕r is obtained.

That is, it can be seen that the fault spreads because the fault injected into p influences not only p but also q.

Accordingly, if the fault injected into p spreads to q and r, the fault value is also applied to the values of $S_{pr}$ and $S_{qr}$ calculated at step S160, and therefore a primary fault-injection attack may be detected by comparing the values of $S_{pr}$ and $S_{qr}$ at step S170. In this case, if $S_{pr}$ is different from a value obtained by computing $S_{qr}$ mod pop(r), it is determined that a fault has been injected, thereby detecting the fault.

In this case, the probability of detecting a fault is proportional to the length of r. Here, since r is a random prime, the length of r is variable. If a large value is selected for r, the probability of an undetectable fault being present decreases, but operation efficiency deteriorates because the modular operation involving the large number should be computed. In contrast, if a small value is selected for r, operational efficiency relatively increases, but safety may be jeopardized because there is an increased probability of an undetectable fault being present. As a result, in order to provide sufficient safety, the number of bits of r should be at least 32.

If a fault is not detected at step S170, a process subsequent to A of FIG. 5 will be performed.

As shown in FIG. 5, the method of preventing fault-injection attacks on CRT-RSA cryptography operations according to the present invention calculates $S_p$ and $S_q$ using the values of $S_{pr}$, $S_{qr}$, p and q calculated at step S160.

In other words, $S_p$ is calculated by computing $S_{pr}$ mod pop(p), $S_{pr}$ being calculated at step S160, and $S_q$ is calculated by computing $S_{qr}$ mod pop(q), $S_{qr}$ being calculated at step S160.

Thereafter, the signature value S is calculated by performing CRT recombination on $S_p$ and $S_q$ which are calculated at S200 at step S210. The signature value S can be calculated by adding $S_q$ to a value obtained by multiplying a value by q, the last value being obtained by multiplying a value obtained by computing $(S_p−S_q)$ mod p by a value obtained by computing $q^{-1}$ mod p.

Then, at step S220, a secondary fault-injection attack may be detected by comparing the signature value S calculated at step S210 with $S_p$ and $S_q$ calculated at S200. That is, if a value obtained by computing $S_{pr}$ mod p or a value obtained by computing $S_{qr}$ mod q is different from the signature value S, it is determined that a fault has been injected, and the fault is detected. At step S220, a fault injected into a CRT recombination during the process of calculating the signature value S is detected.

Thereafter, a process subsequent to B of FIG. 6 is performed.

As shown in FIG. 6, method of preventing fault-injection attacks on CRT-RSA cryptography operations according to the present invention calculates the value of check using the cumulative value of sum at step S300. Thereafter, it is checked whether the value of check is 0 at step S310. Here, a tertiary fault-injection attack may be detected depending on whether the value of check is 0.

In other words, in a normal case, sum=p⊕q⊕r and W={p, q, r}, thus resulting in check=sum⊕(p⊕q⊕r)=0.

Meanwhile, when a fault is injected during an internal operation of the pop function, the value of p which is used for a modulo operation is distorted, and also the distorted value of q is calculated when the value of q is popped, so that the fault spreads. That is, when a fault is injected during an internal operation of the pop function, check≠0 is obtained because of the spread of the fault.

Accordingly, if the value of check is not 0 at step S310, it is determined that a fault has been injected and the fault is detected at step S320.

Meanwhile, it is possible to implement all the steps of a method of preventing fault-injection attacks on CRT-RSA cryptography operations according to the present invention using computer readable code which is stored in a computer readable medium.

The computer readable medium includes all types of recording media in which data which can be read by a computer system can be stored. Examples of the computer readable recording medium include ROM, RAM, CD-ROM, CD-RW, magnetic tape, a floppy disk, a HDD, an optical disk, and a magneto-optical storage device. Furthermore, the computer readable recording medium may be implemented in the form of carrier waves (for example, in the case of transmission over the Internet). Furthermore, the computer readable recording medium may be distributed among computer systems connected via a network, and computer readable code is stored and executed in a distributed manner.

Figure 7:
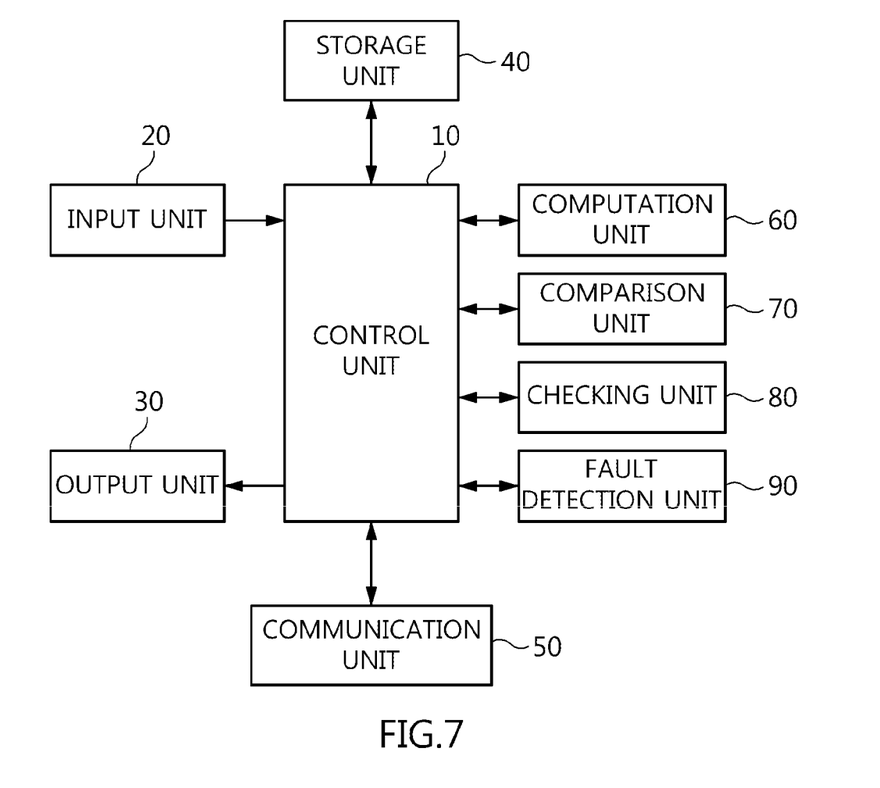
FIG. 7 is a block diagram showing the configuration of an apparatus for preventing fault-injection attacks on CRT-RSA cryptographic operations according to the present invention.

FIG. 7 shows an apparatus for preventing fault-injection attacks on CRT-RSA cryptography operations.

As shown in FIG. 7, the apparatus for preventing fault-injection attacks on CRT-RSA cryptography operations includes a control unit 10, an input unit 20, an output unit 30, a storage unit 40, a communication unit 50, a computation unit 60, a comparison unit 70, a checking unit 80, and a fault detection unit 90. Here, the control unit 10 controls the operations of the units of the apparatus for preventing fault-injection attacks.

The input unit 20 is means for receiving initial values or key values for the performance of the CRT-RSA cryptography algorithm from an administrator. The input unit 20 receives a plurality of factors, that is, a message m to be sent, d, primes p and q, and $z=q^{-1}$ mod p as keys, and also receives a randomly selected short prime r.

The output unit 30 outputs the results of the performance of the CRT-RSA cryptography algorithm, or the results of the detection of a fault which is injected during the performance of the CRT-RSA cryptography algorithm.

The storage unit 40 stores the CRT-RSA cryptography algorithm which is applied to the present invention. Here, the CRT-RSA cryptography algorithm stored in the storage unit 40 is implemented as computer readable code. The storage unit 40 may be at least one of ROM, RAM, CD-ROM, CD-RW, magnetic tape, a floppy disk, a HDD, an optical disk, and a magneto-optical storage device, or computer systems which are connected via a network.

The communication unit 50 provides a communication interface which enables communication with an external receiving terminal or computer system. Using the communication unit 50, initial values or key values for the performance of the CRT-RSA cryptography algorithm may be received from the outside, and the results of the performance of the CRT-RSA cryptography algorithm may be sent to the outside.

The computation unit 60 executes the CRT-RSA cryptography algorithm stored in the storage unit 40 when the initial values or key values for the performance of the CRT-RSA cryptography algorithm are input. In this case, the computation unit 60 calculates the values of $d_{pr}$, $d_{qr}$, p', q', $S_{pr}$, $S_{qr}$, $S_p$, $S_q$, and S shown in FIG. 1 by applying the initial values or key values to the CRT-RSA cryptography algorithm. Here, since the method of calculating the values of $d_{pr}$, $d_{qr}$, p', q', $S_{pr}$, $S_{qr}$, $S_p$, $S_q$, and S has been described above, the description of the method is omitted here.

The comparison unit 70 compares predetermined values that are selected from among the values which are calculated while the computation unit 60 executes the CRT-RSA cryptography algorithm.

As an example, the comparison unit 70 compares a value calculated by computing $S_{pr}$ mod pop(r) with a value calculated by computing $S_{qr}$ mod pop(r), as shown in the tenth row of FIG. 1. Furthermore, the comparison unit 70 compares S with $S_{pr}$ mod p, or compares S with $S_{qr}$ mod q, as shown in the 14th row of FIG. 1.

In this case, the results of the comparison of the comparison unit 70 are used by the fault detection unit 90 to detect a fault.

The checking unit 80 checks the total cumulative value of the variables at the last step of the CRT-RSA cryptography algorithm. In other words, the checking unit 80 calculates the value of check from the value of sum in which p, q and r are accumulated, and finally checks whether the value of check is 0.

The fault detection unit 90 detects a fault-injection attack based on the results of the comparison unit 70 and the results of the checking of the checking unit 80.

As an example, the fault detection unit 90 determines that a fault has been injected if $S_{pr}$ is different from a value calculated by computing $S_{qr}$ mod pop(r), and detects the fault. Furthermore, the fault detection unit 90 determines that a fault has been injected if a value calculated by computing $S_{pr}$ mod p or a value calculated by computing $S_{qr}$ mod q is different from the signature value S, and detects the fault. Furthermore, the fault detection unit 90 determines that a fault has been injected if the value of check calculated in the final checking process is not 0, and detects the fault.

As described above, a fault injected during the retrieval of a specific value, a fault injected during the internal operation of a pop function, or a fault injected during CRT recombination influences not only the specific value, for example, p, but also other variables, that is, q and r, because of the spread of the fault, so that it is possible to easily detect the fault using the CRT-RSA cryptography algorithm which is applied to the present invention.

The present invention has the advantage of being safe from fault-injection attacks and also the advantage of efficiently computing a signature value because the method according to the present invention is capable of preventing fault-injection attacks occurring during the execution of the operations of a CRT-RSA cryptography algorithm.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

In the attached claims, the "message" corresponds to m, the "first prime" corresponds to p, the "second prime" corresponds to q, the "random prime" corresponds to r, the "first multiplication value" corresponds to p', the "first exponent" corresponds to $d_{pr}$, the "second exponent" corresponds to $d_{qr}$, the "second multiplication value" corresponds to q', the "first random reference value" corresponds to $S_{pr}$, the "second random reference value" corresponds to $S_{qr}$, the "third random reference value" corresponds to $S_p$, the "fourth random reference value" corresponds to $S_q$, and the "signature value" corresponds to S.

What is claimed is:

1. A method of preventing fault-injection attacks on Chinese Remainder Theorem (CRT)-Rivest Shamir Adleman (RSA) cryptographic operations, comprising:
   configuring at least one hardware processor(s) to perform the following steps:
   receiving a first prime and a second prime, that are different primes, and a randomly selected prime, that is, a random prime, which are used for CRT-RSA cryptographic operations;
   performing CRT-RSA operations by computing modulo operations using the first prime and the second prime;
   calculating a cumulative value by performing an XOR (Exclusive OR) operation on the first prime, the second prime, and the random prime using a push function; and
   loading the first prime, the second prime, and the random prime by performing an XOR operation on the cumulative value using a pop function corresponding to the push function, wherein a fault injected during the CRT-RSA operation can be detected by evaluating a result of said pop function.

2. The method as set forth in claim 1, wherein a fault having occurred during the loading of any one of the first prime, the second prime, and the random prime spreads to remaining values of the first prime, the second prime, and the random prime via the cumulative value, thereby preventing the fault-injection attacks.

3. The method as set forth in claim 2, further comprising calculating first and second multiplication values by multiplying each of the loaded first and second primes by the random prime, calculating a first random reference value by computing (a message to be sent raised to a power of a first exponent) mod (the first multiplication value) and a second random reference value by computing (the message raised to a power of a second exponent) mod (the second multiplication value), and detecting a fault, having occurred during the operations for calculating the first and second random reference values, using the first random reference value and the second random reference value.

4. The method as set forth in claim 3, wherein the detecting the fault comprises comparing a value obtained by computing (the first random reference value) mod (the loaded random prime) with a value obtained by (the second random reference value) mod (the random prime), and determining that the fault has occurred if the two values are different from each other.

5. The method as set forth in claim 3, further comprising calculating third and fourth random reference values by computing (the loaded first prime) mod (the first random reference value) and (the loaded second prime) mod (the second random reference value), and detecting that a fault has occurred during an operation for calculating a signature value using the third and fourth random reference values.

6. The method as set forth in claim 5, wherein the detecting that a fault has occurred during an operation for calculating a signature value comprises determining that the fault has occurred if a value obtained by computing (the signature value) mod (the first prime) and a value obtained by computing (the first prime) mod (the first random reference value) are different from each other, or if a value obtained by computing (the signature value) mod (the second prime) and a value obtained by computing (the second prime) mod (the second random reference value) are different from each other.

7. The method as set forth in claim 1, further comprising detecting the fault having occurred during the CRT-RSA operation using a value obtained by adding the first prime, the second prime and the random prime together.

8. The method as set forth in claim 1, wherein the random prime has a size of at least 32 bits.

* * * * *